3,794,524
STRIPPING METHOD

Andrew Nogueira, Cincinnati, and Harry J. Packer, Dayton, Ohio, assignors to Chemed Corporation, Cincinnati, Ohio
No Drawing. Continuation of abandoned application Ser. No. 49,206, June 23, 1970. This application Nov. 21, 1972, Ser. No. 308,610
Int. Cl. B08b 5/00; C09d 9/00
U.S. Cl. 134—31                              1 Claim

ABSTRACT OF THE DISCLOSURE

Method for stripping resin-base deposits and similar coatings from a substrate which includes contacting vapor evolved from a boiling azeotropic mixture with the substrate disposed deposit. The present method is particularly useful for stripping durable resin-base paint adhered to a metal substrate in the form of coatings and other deposits.

---

This is a continuation of application Ser. No. 49,206 filed June 23, 1970, and now abandoned.

The present invention relates to a method for stripping resinous coatings and other resinous deposits from a substrate using vapor evolved from a boiling azeotropic mixture.

Numerous compositions and methods for removing deposits of paint, resin coatings and the like are available to the art. For example, paint stripping methods using liquid and paste compositions are known. Typically, painted surfaces are immersed in hot alkaline baths for paint removal while in other instances a liquid or paste paint remover is applied to the painted surfaces and the thus treated paint is removed mechanically by scraping, brushing, or the like. In using some liquid paint removers and some paste paint removers, the treated paint may be removed by washing.

Tenaciously adherent durable paints and coatings which are based upon chemically resistant resins such as vinyl, acrylic, epoxy resins and the like present a unique problem for conventional paint removal compositions. Although paint strippers are available for these durable paints, such strippers have not been entirely satisfactory from the standpoint of efficient rapid removal of such paint. Typically, these strippers require prolonged periods of treatment for complete stripping. Aqueous alkali solutions containing phenolic compounds such as cresylates have been employed with diminishing commercial acceptance as hot tank strippers because of problems associated with disposal of phenolics.

U.S. Pat. No. 2,689,198 to Judd discloses the use of, for example, trichloroethylene, benzene, xylene, toluene, and butyl lactate for removal of paint from newly painted articles by a process which includes contacting the articles with solvent vapors. The Judd patent teaches, however, that several liquid immersion steps are required to effect substantially complete paint removal prior to the vapor contact step. This and other prior art stripping methods using liquid immersion systems suffer disadvantages in that the active ingredient is subject to dilution and fouling during the stripping operation.

It has now been found, by the practice of the present invention, that use of an azeotropic mixture provides fast, superior removal of durable and tenaciously adherent coatings and resin deposits. Such removal is effected in the present method by contacting a substrate having such deposits thereon with constant composition azeotrope vapors evolved during boiling. The present vapor phase stripping method overcomes many of the disadvantages inherent in prior art stripping methods and provides a useful means for removal of deposits including resins and durable paints such as those based on polyester, alkyd, acrylic or epoxy resins. Use of the azeotropic mixtures provides favorable and improved effects such as increased stripping rate, high flash point and in some instances substantial non-flammability, improved rinsing, greater vapor condensation, less metal corrosion and, where paint is stripped, dissimilar primer-topcoat stripping. Contacting the substrate-disposed deposit with the azeotropic vapor tends to protect the substrate from any substrate-attacking materials which may enter or form in the liquid mixture during use. A further advantage of the present method is that by simple distillation an original azeotropic mixture may be readily reclaimed from used mixture having residues of stripped paint therein.

Generally stated, the present invention provides a method for stripping a deposit from a substrate using an azeotropic mixture including an azeotrope-forming halogenated hydrocarbon component. The azeotropic mixture includes one or more additional components which in combination with the halogenated hydrocarbon component form a binary or higher azeotrope. Typical additional components useful herein are exemplified by carboxylic acid, glycol and amine. The present method includes boiling the azeotropic vapor with the deposit to be stripped from the substrate.

Practice of the present invention will become more apparent from the following detailed description.

Azeotrope-forming halogenated hydrocarbons which are useful in the present method include halogenated aliphatic hydrocarbons and halogenated aromatic hydrocarbons. Hydrocarbons halogenated with chlorine, bromine, fluorine and combinations thereof are found effective herein. Halogenated aliphatic hydrocarbons useful herein include, generally, the $C_1$–$C_5$ aliphatics. Preferred among these are methylene halide and the ethylenically unsaturated $C_2$–$C_5$ aliphatics. Methylene chloride, trichloroethylene and perchloroethylene are particularly effective azeotropic components for use in the present method. Halogenated aromatic hydrocarbons found useful herein are exemplified by bromobenzene, orthodichlorobenzene, chlorobenzene, chlorotoluene and the like.

An azeotropic mixture generally found useful herein includes an azeotrope of a halogenated hydrocarbon with a component selected from $C_1$–$C_7$ carboxylic acids, and phenyl and $C_1$–$C_4$ alkyl esters of $C_1$–$C_7$ carboxylic acids. The main chain of the carboxylic acid and the carboxylic acid derivative may have substituted thereon various functional groups, including, in particular, the more electronegative halogens. The functional substituents are selected for their usefulness in a particular end use of the azeotrope. Among the carboxylic acids found useful herein there may be mentioned acetic acid, chloroacetic acid and benzoic acid.

Another azeotropic mixture found useful herein includes an azeotrope of a halogenated hydrocarbon with an amine. Effective stripping is provided by the present method using an azeotrope having an amine component selected from $C_1$–$C_3$ alkyl amines; di-$C_1$–$C_3$ alkyl amines; $C_1$–$C_2$ acyl amines; N-$C_1$–$C_2$ acyl-, N-$C_1$–$C_3$ alkyl amines; and N-$C_1$–$C_2$ acyl-, N,N-di-$C_1$–$C_3$ alkyl amines. A preferred amine for use herein is dimethylformamide, an N-$C_1$ acyl-, N,N-di-$C_1$ alkyl amine.

Yet another azeotropic mixture which is useful herein includes an azeotrope of a halogenated hydrocarbon with a glycol. Excellent stripping has been observed for the present method using an azeotrope having a glycol component such as ethylene glycol, diethylene glycol, hexylene glycol and ethoxytriglycol.

Other azeotropic mixtures found useful herein include water and halogenated hydrocarbon which form binary and higher order azeotropes with water. Exemplary of water-containing azeotropic mixtures effective herein is a ternary azeotrope of ethylene dichloride, water and isopropyl alcohol.

Liquid mixtures for use in the present method may include, in addition to the essential azeotrope, suitable antioxidants, stabilizers and the like, if desired.

The azeotropes generally preferred herein include from about 75 to about 95 parts by weight of a halogenated hydrocarbon component and from about 25 to about 5 parts by weight of a carboxylic acid, amine or glycol component which forms an azeotrope with the halogenated hydrocarbon component.

Deposits which may be stripped effectively using the present method include, for example, paint coatings and encrustations, resin finishes, and the like.

In the present method, an azeotropic solvent mixture is vaporized at its boiling point; a deposit to be stripped from a substrate is contacted with the evolved azeotrope vapor; and thereafter at least a substantial amount of the deposit is removed from the substrate. Stripping is preferably effected in a closed system to prevent loss of vapors and for safety purposes. If desired, an apparatus having the structure of a vapor degreasing machine may be used for this purpose. The stripping apparatus preferably has a portion of the outside enclosed with cooling coils to provide a continuous refluxing of the solvent vapors. The particular apparatus employed, however, is not critical to the practice of this invention.

The present method may be used for removing paints, resins and the like from a wide variety of substrates including, for example, iron, copper, aluminum, and like metals and their alloys. Paints which may be removed by this method include varnishes, enamels, latices, emulsion coatings and the like. Drying oil base paints, acrylic base paints, epoxy base paints, phenolic base paints, and rubber base paints may also be effectively removed using the method of the present invention. This method is particularly suitable for removing polyester enamels and acrylic paints, even though undercoated with an epoxy primer, from ferrous metal surfaces such as steel. Alkyd amine paint coatings are also rapidly removed by the present composition.

The present method has been found to be especially effective in relation to penetration and stripping properties for acrylic based paints, for which substantially complete paint removal, without any mechanical treatment, has been observed. Batches of the azeotropic mixtures used herein are characterized by extended service life. Even after repeated use, the present azeotrope may be restored to essentially its initial condition by distillation and condensation of the vapors, while the condensed vapors are found to be of substantially the initial liquid composition.

The excellent stripping effectiveness of the present method, which in some instances is found to effect paint stripping in less than 2 minutes, is believed to be due to a synergistic effect of the components in the azeotropic mixture. It is to be emphasized that the herein used mixture, which may be formed of known solvents, includes these solvents in specific proportions which constitute a constant boiling azeotropic mixture. Unlike ordinary solvent mixtures, the presently used azeotropic mixtures provide, upon continued boiling, a constant composition vapor. Substrates to be stripped of deposits may thereby be exposed to a known and substantially undeviating vapor composition. As a corollary attribute, the temperature of the constant composition vapor is substantially constant during use. Heat sensitive substrates are thereby protected from continuously increasing temperatures to which substrates are typically subjected when exposed to vapors evolved from continuously boiled batches of non-azeotropic solvent mixtures.

This invention will be further illustrated by the following non-limiting examples wherein all designated parts are by weight unless otherwise indicated.

EXAMPLE 1

An azeotropic mixture was formed by mixing about 93 parts of perchloroethylene with about 7 parts of dimethylformamide. The azeotropic mixture thus formed will hereinafter be referred to as Azeotrope A.

EXAMPLE 2

Sections of a motor core having about a 10 to 15 mil thick fluidized spray coating of an epoxy paint available from Polypenco Co. under the trademark Corvel were treated to remove the paint. The coated sections were placed over beakers containing Azeotrope A of Example 1. The mixtures were heated to boiling at a temperature of 248° F. and the evolved Azeotrope A vapors were contacted with the paint coating. The effect of the vapor penetration was readily evident. After a 1 hour interval substantially all the coating had been removed. Usually this accumulation of paint requires 8 hours for similar removal using hot tank akaline stripping methods.

EXAMPLE 3

The procedure of Example 2 was followed except the painted motor core sections were substituted by metal panels coated with an 0.0015 inch coating of Sherwin Williams Acrylic Finish Permaclad 2100 Enamel. After only one minute the paint coating was found to be completely removed. This paint is not appreciably removed even after immersion for 45 minutes in a 20 percent caustic solution.

EXAMPLE 4

The procedure of Example 3 was followed except that paint hooks were coated with a Hanna Co. alkyd amine to a ¼ inch thickness. Substantially all the paint coating was found to be removed in 2 hours. An equivalent effect is not usually observed until after 16 hours treatment in a highly caustic, chlorinated phenol solution at a boil.

EXAMPLE 5

An azeotropic formulation was prepared by mixing about 89 parts of bromobenzene with about 11 parts of chloroacetic acid. This formulation will hereinafter be referred to as Azeotrope B.

EXAMPLE 6

4" x 6" steel panels having a primer coat of De Soto Co. 732–005 epoxy primer and a finish coat of De Soto Co. 741–003 acrylic finish were treated to remove the paint accumulation. The steel panels were placed over beakers containing Azeotrope B of Example 5. The painted panels were contacted with vapors of Azeotrope B boiling at 311° F. Effective vapor penetration was immediately evident, and after a short interval of about 10 minutes the paint was found to be completely removed. Removal of this type coating is impractical by conventional hot tank alkaline stripping methods.

EXAMPLE 7

An azeotropic mixture was formed by mixing about 80 parts orthodichlorobenzene with about 20 parts ethylene glycol. This mixture will hereinafter be referred to as Azeotrope C.

EXAMPLE 8

4" x 6" steel panels having a Hanna Co. experimental polyester enamel coating were treated to remove the paint. The steel panels were placed over beakers containing Azeotrope C of Example 7 and contacted with vapors of this mixture which was boiled at 332° F. The polyester enamel coating was found to be completely stripped in less than 2 minutes using Azeotrope C. Comparable removal of this paint from steel panels usually requires about 40 minutes with a hot 10 percent caustic solution.

EXAMPLE 9

A ternary azeotrope was formed by admixing about 73.8 parts of ethylene dichloride, about 18.6 parts of isopropyl alcohol and about 7.6 parts of water.

1″ x 3″ steel panels having a 1.5 mil coating of Sherwin Williams Acrylic Finish Permaclad 2100 were contacted with vapors evolved from this ternary azeotropic mixture boiling at about 163° F. Substantially all the coating was removed in about 15 seconds. Removal of this type coating typically requires 45 minutes using hot 20 percent caustic solution.

Although as used in the foregoing detailed description the terms "coating" and "deposit" have principal reference to protective coatings of resins, resin based paints and the like, it is recognized that the present stripping method may find use in removing numerous types of deposits from a variety of substrates. It is further recognized that numerous azeotropic formulations having two or more azeotrope-forming components may be usefully employed in the present method.

It is to be understood that the foregoing detailed description is given merely by way of illustration and that many variations may be made therein without departing from the spirit or scope of this invention.

We claim:
1. A method for stripping a deposit based on polyester, alkyd, acrylic or epoxy resins from a substrate which consists essentially of:
(A) heating an azeotropic mixture to form an azeotropic vapor; said azeotropic mixture comprising about 93 parts by weight perchloroethylene and about 7 parts by weight dimethylformamide;
(B) contacting the said azeotropic vapor with the deposit to be stripped from the substrate; and thereafter
(C) removing at least a substantial amount of the deposit from the substrate.

References Cited
UNITED STATES PATENTS

| | | | |
|---|---|---|---|
| 2,070,962 | 2/1937 | Reid | 252—DIG. 009 |
| 3,527,708 | 9/1970 | Clark et al. | 134—40 |
| 3,539,462 | 11/1970 | Schofield | 252—170 |
| 3,573,213 | 3/1971 | Burt | 260—652.5 R X |
| 2,310,569 | 2/1943 | Booth | 134—11 UX |
| 2,944,924 | 7/1960 | Wiklunoh et al. | 134—11 |
| 3,073,721 | 1/1963 | Pokorny | 134—31 UX |

FOREIGN PATENTS

| | | | |
|---|---|---|---|
| 818,331 | 8/1959 | Great Britain | 134—38 |

OTHER REFERENCES

Handbook of Chemistry & Physics, 46th ed. (1965–1966), Cleveland, Ohio, The Chemical Rubber Co. 1964–1965, pp. D–3, 4, 7, 9, 21.

MORRIS O. WOLK, Primary Examiner

A. TURK, Assistant Examiner

U.S. Cl. X.R.

134—38; 252—171, DIG. 009